US012095155B2

(12) United States Patent
Ahmadloo

(10) Patent No.: US 12,095,155 B2
(45) Date of Patent: Sep. 17, 2024

(54) RADAR SENSOR WITH RECESSED RADOME

(71) Applicant: Magna Electronics, LLC, Southfield, MI (US)

(72) Inventor: Majid Ahmadloo, Lowell, MA (US)

(73) Assignee: Magna Electronics, LLC, Southfield, MI (US)

(*) Notice: Subject to any disclaimer, the term of this patent is extended or adjusted under 35 U.S.C. 154(b) by 117 days.

(21) Appl. No.: 17/560,987

(22) Filed: Dec. 23, 2021

(65) Prior Publication Data
US 2023/0208018 A1 Jun. 29, 2023

(51) Int. Cl.
*H01Q 1/42* (2006.01)
*G01S 13/931* (2020.01)
*H01Q 1/38* (2006.01)
*H01Q 9/04* (2006.01)

(52) U.S. Cl.
CPC ............ *H01Q 1/42* (2013.01); *G01S 13/931* (2013.01); *H01Q 1/38* (2013.01); *H01Q 9/0407* (2013.01)

(58) Field of Classification Search
CPC .......... H01Q 1/42; H01Q 1/38; H01Q 9/0407; G01S 13/931
See application file for complete search history.

(56) References Cited

U.S. PATENT DOCUMENTS

| | | | |
|---|---|---|---|
| 5,990,835 A * | 11/1999 | Kuntzsch | H01Q 1/24 343/846 |
| 7,696,938 B2 | 4/2010 | Schmidt et al. | |
| 9,115,569 B2 * | 8/2015 | Tang | E21B 47/0228 |
| 10,044,099 B2 | 8/2018 | Leung et al. | |
| 10,074,907 B2 | 9/2018 | Ding et al. | |
| 2015/0004423 A1 * | 1/2015 | Cheon | H01Q 1/422 428/521 |
| 2016/0268693 A1 * | 9/2016 | Ding | H01Q 1/526 |
| 2016/0306034 A1 * | 10/2016 | Trotta | G01S 13/343 |
| 2018/0115084 A1 * | 4/2018 | Tsuchiya | H01Q 19/021 |
| 2020/0028275 A1 | 1/2020 | Ahmadloo et al. | |

(Continued)

FOREIGN PATENT DOCUMENTS

| | | |
|---|---|---|
| EP | 3033634 B1 | 5/2017 |
| EP | 3017503 B1 | 7/2017 |
| EP | 3191864 B1 | 10/2019 |

(Continued)

OTHER PUBLICATIONS

International Search Report and Written Opinion of International Application No. PCT/US2022/052688 mailed on Apr. 12, 2023.

*Primary Examiner* — Ricardo I Magallanes
*Assistant Examiner* — Aladdin Abdulbaki
(74) *Attorney, Agent, or Firm* — Burns & Levinson LLP; Daniel J. McGrath

(57) ABSTRACT

A radar sensor includes a housing, cover, and a plurality of transmit and receive antennas. The housing includes a cavity retaining a processing board. The cover defines a radome having a recess into the cavity with two separate and connected areas. The transmit and receive antennas are positioned on the processing board, adjacent to, and separated by a gap from, the recess. The transmit antennas are configured to transmit RF signals through the first area of the recess. The receive antennas are configured to receive RF signals returning through the second area of the recess.

15 Claims, 6 Drawing Sheets

(56) References Cited

U.S. PATENT DOCUMENTS

2020/0403307 A1* 12/2020 Ahmadloo ............... H01Q 1/42
2022/0209396 A1* 6/2022 Lee ..................... H01Q 1/3233

FOREIGN PATENT DOCUMENTS

| EP | 3080867 | B1 | | 2/2020 | |
|----|---------|----|----|--------|----|
| JP | 2003344535 | A | * | 12/2003 | |
| JP | 2007201868 | A | * | 8/2007 | |
| KR | 20170061426 | A | | 6/2017 | |
| KR | 102288673 | B1 | | 8/2021 | |
| WO | WO-2005043675 | A1 | * | 5/2005 | ......... B60C 23/0444 |

* cited by examiner

RADAR SENSOR WITH RECESSED RADOME

FIELD OF THE TECHNOLOGY

The present disclosure is related to radar detection systems and, in particular, to an automotive radar sensor.

BACKGROUND OF THE TECHNOLOGY

Vehicles often include sensing systems which can be used for collision avoidance, self-driving, cruise control, and the like. Radar sensing systems can rely on one or more transmit (Tx) and one or more receive (Rx) antennas formed on a surface, e.g., top surface, of a substrate, which can be a printed circuit board (PCB). Digital, analog, and RF circuitry associated with the sensor can be mounted on the PCB on the same surface as the antennas and/or on the opposite, e.g., bottom, surface.

Use within automotive vehicles presents a number of unique challenges for radar sensors. The limited amount of space available on a vehicle underscores the need for sensors which are compact and small in size. This can be especially important when using in-cabin monitoring sensors which are mounted within the congested interior of the vehicle. This results in sensors with closely packed components, including Tx and Rx antennas, which can result in undesired interferences and significantly degrade performance of the sensor. As such, there is a need for a radar sensor which minimizes size, while still being accurate and cost effective.

SUMMARY OF THE TECHNOLOGY

In at least one aspect, the subject technology relates to a radar sensor. The sensor has a sensor housing including a cavity retaining a processing board within the cavity. A cover forms a face of the sensor housing, the cover defining a radome having a recess into the cavity. The recess includes a first area and a second area separate from and connected to the first area. A plurality of transmit antennas are on a surface of the processing board, the transmit antennas being adjacent to and separated by a first gap from the first area. The transmit antennas are configured to transmit RF signals through the first area. A plurality of receive antennas are on the surface of the processing board. The receive antennas are adjacent to, and separated by a second gap from, the second area. The receive antennas are configured to receive RF signals returning through the second area.

In some embodiments, a first corner of the first area is connected to a second corner of the second area. The first area and the second area can each be defined by a plurality of separate and distinct edges. In some cases, centers of the plurality of receive antennas are aligned parallel along a major axis. In some embodiments, centers of the plurality of transmit antennas are offset from the major axis and aligned along a second axis oblique to the major axis. The transmit antennas and the receive antennas can be oriented parallel to the second axis. The transmit antennas and receive antennas can be aligned to face in opposite directions.

In some embodiments, patches of the receive antennas and transmit antennas are of the same shape. The major axis and the second axis can be separated by an angle of substantially 45 degrees. In some cases, the first area and the second area are offset with respect to the major axis. In some embodiments, the plurality of receive antennas each include only a single antenna patch.

In some embodiments, a first receive antenna includes a lower patch edge and a second receive antenna includes an upper patch edge, the lower patch edge being parallel to the upper patch edge. In some cases, a first transmit antenna includes a lower patch edge and a second transmit antenna includes an upper patch edge. At least a portion of the lower patch edge is disposed above at least a portion of the upper patch edge relative to a minor axis, the minor axis running perpendicular to the major axis. In some embodiments, the plurality of receive antennas include a first receive antenna with a first antenna patch and a second receive antenna with a second antenna patch, the radar sensor further comprising a first and second inoperative antenna patch, wherein the first and second receive antennas are disposed between the first and second inoperative antenna patches. In some cases, the cover thickness at the recessed area is 1.35 mm and the first gap and the second gap are 1.3 mm.

BRIEF DESCRIPTION OF THE DRAWINGS

The present disclosure is further described in the detailed description which follows, in reference to the noted plurality of drawings by way of non-limiting examples of implementations of the present disclosure, in which like reference numerals represent similar parts throughout the several views of the drawings.

FIG. 3b is a bottom perspective view of the cover of the radar sensor of FIG. 3a.

FIG. 3c is a bottom perspective view of the cover of the radar sensor of FIG. 3a.

FIG. 6 is a top view of a PCB for the radar sensor of FIG. 3a.

DETAILED DESCRIPTION

Figure 1:
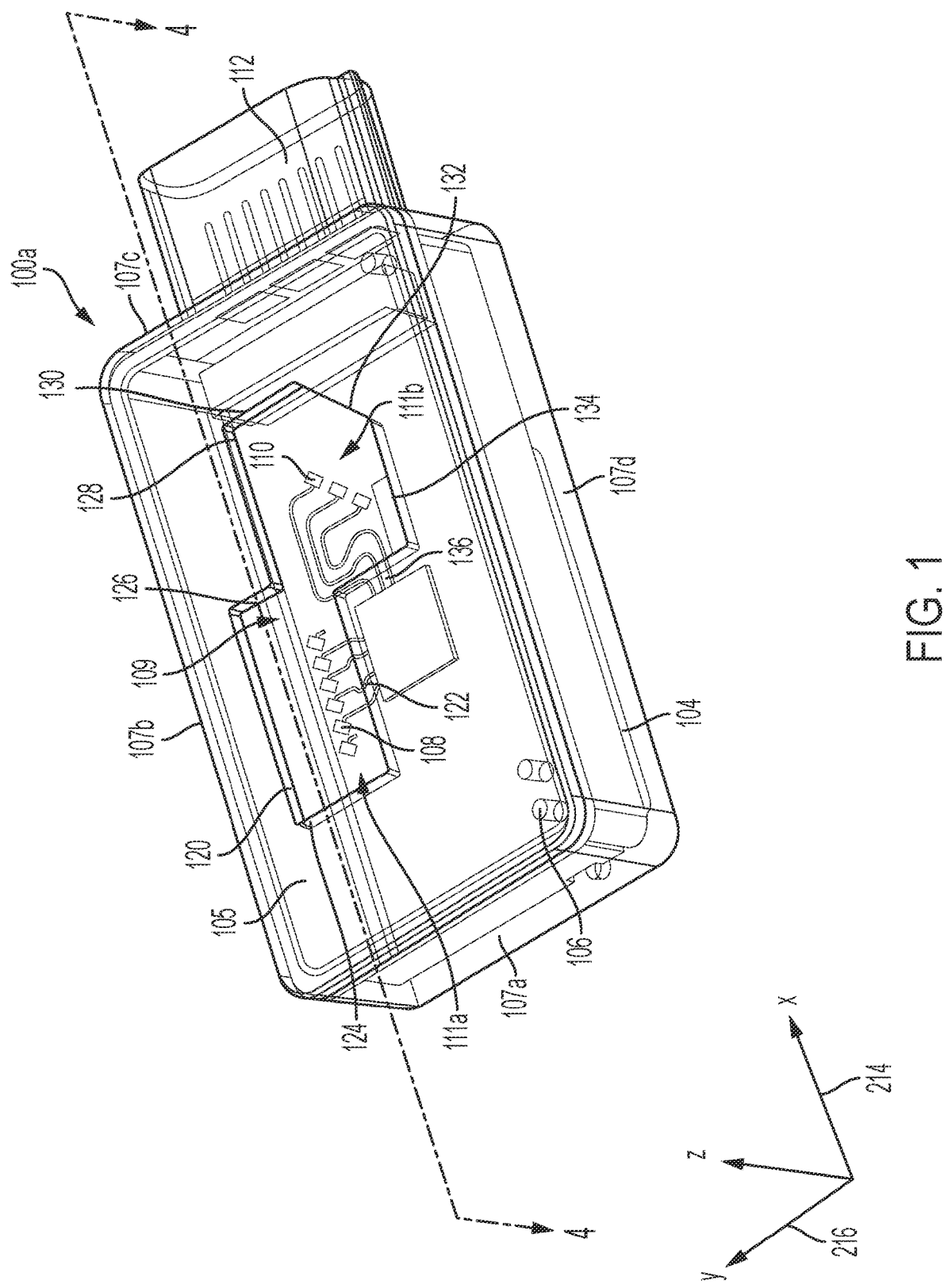
FIG. 1 is a top perspective view of a first embodiment of a radar sensor in accordance with the subject technology.
Figure 2C:
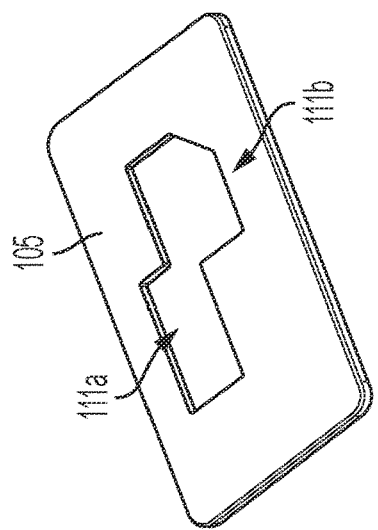
FIG. 2c is a bottom perspective view of the cover of the radar sensor of FIG. 1.
Figure 2B:
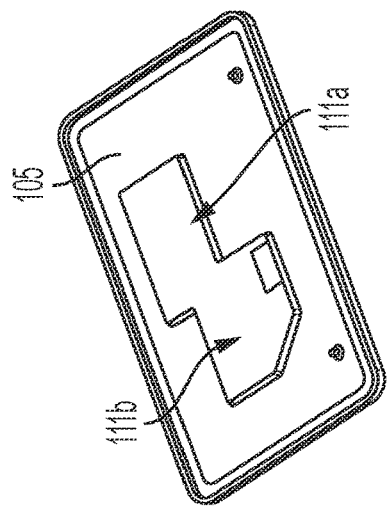
FIG. 2b is a bottom perspective view of the cover of the radar sensor of FIG. 1.
Figure 2A:
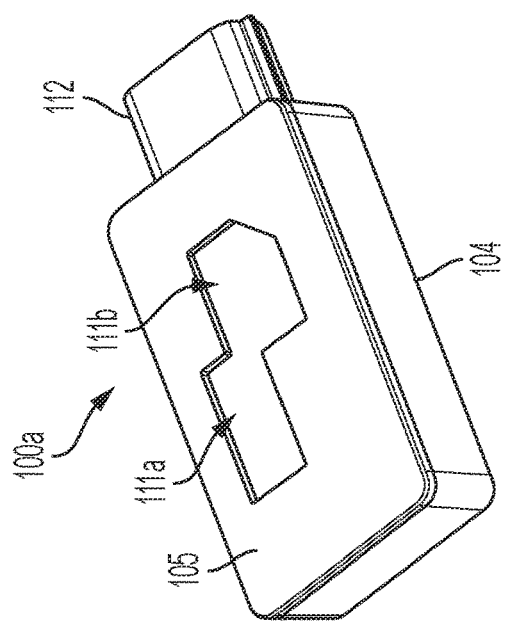
FIG. 2a is another top perspective view of the radar sensor of FIG. 1.
Figure 3C:
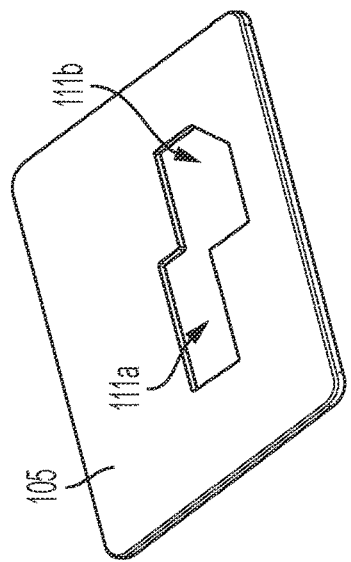
Figure 3B:
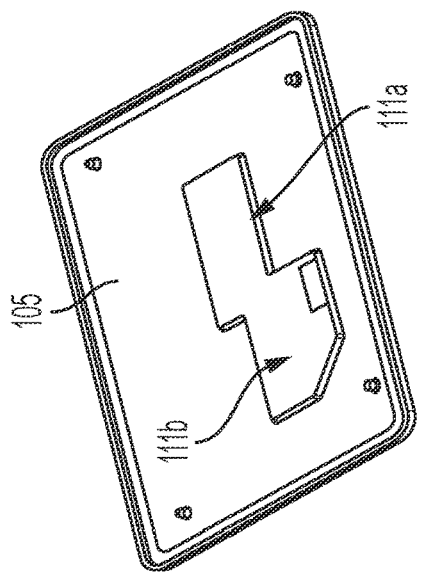
Figure 3A:
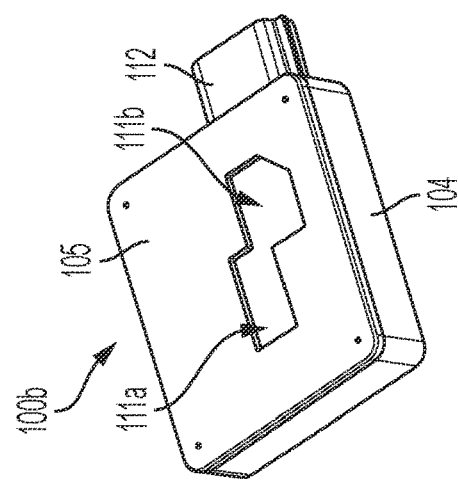
FIG. 3a is a top perspective view of a second embodiment of a radar sensor in accordance with the subject technology.

The subject technology overcomes many of the prior art problems associated with vehicle sensing systems. In brief summary, the subject technology provides a radar sensor for an automotive sensing system which includes a recessed cover (or radome) and compact antenna arrangement. The radar sensor includes a particular radome and packaging utilized for automotive radar sensors in order to provide desired RF performances and antenna patterns required to achieve detection and classification performances expected from the radar sensor. This is particularly of interest when it comes to In-Cabin Monitoring Sensors (ICS) which often require very small packages in size to provide more flexibility in utilizing such sensors inside rather congested cabin interior. Such miniaturized sensor size also helps reducing undesired RF interaction of the sensor with the surrounding features and material such as wires, harnesses, storage compartments, and other potential sources of interference.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation).

In radar sensor modules, such as automotive radar sensor modules, a radome can be used to house the antenna components to protect the sensor from external elements such as moisture and other physical contaminants such as road debris. The radome can also impact the radiation and reception properties of the antennas. For example, the radome can be used in shaping the beam to adjust and/or optimize the performance of the sensor. Radome covers are typically placed a predetermined distance over the top surface of the planar patch antennas, the predetermined distance being at least partially determined based on desired sensor performance.

The antenna components typically include both transmit (Tx) and receive (Rx) antenna components, implemented by forming arrays of conductive antenna "patches" on the surface of a printed circuit board (PCB) or other substrate. These patches, as well as associated components such as feed lines, strip lines, waveguides and RF transition elements, e.g., waveguide-to-microstrip line transitions, are commonly formed by depositing metal and/or other conductive material on the surface of the PCB in a predetermined desired pattern.

Referring now to FIGS. 1-6, exemplary radar sensors 100a, 100b (generally 100), configured in accordance with the subject technology, are shown. Two different radar sensor embodiments are shown herein. A first embodiment of a radar sensor 100a and its components are depicted in FIGS. 1, 2a, 2b, 2c, 4, and 5. A second embodiment of a radar sensor 100b and its components are depicted in FIGS. 3a, 3b, 3c, and 6. Generally, these radar sensors 100a, 100b have some differences in overall mechanical structure and size, as depicted, but are otherwise functionally similar. Thus, where the radar sensors 100 are described herein, it can be assumed that the different embodiments (e.g. radar sensors 100a, 100b) are the same except as otherwise shown and described herein.

In some implementations, the radar sensor 100 is an automotive radar sensor module and, as such, is mountable and operable in an automobile or vehicle. Particularly, the radar sensor 100 is small and compact and suitable for mounting as an ICS within a vehicle. The radar sensor 100 includes a structural housing 104 which encloses the components of the radar sensor 100 within an inner cavity 103 of the housing 104. A printed circuit board (PCB) 200a, 200b (generally 200) or other processing board is contained within the housing 104. The PCB 200 can include all necessary processing components for carrying out the functions of the radar sensor 100, such as digital, analog and/or RF electronic components. The PCB 200 can include multiple layers with components being interconnected by conductive vias. A cover 105 provides the top structural face of the housing 104 and can be removably attached to the sides 107a-107d (generally 107) of the housing 104 via alignment posts/stakes 106 which run through alignment holes 208 of the PCB 200. This secures the PCB 200 within the enclosed housing 104 and positions the cover 105 to act as a radome for the radar sensor 100. The cover 105 of the housing 104 can include a recess 109 with two separate recessed areas 111a, 111b (generally 111) which correspond, respectively, to receive antennas 108 and transmit antennas 110, as described in more detail below. The antennas 108, 110 can be electrically connected to, and controlled by, the PCB 200. A connector 112, which can include connector pins, extends from a side 107c of the housing 104 and can be used to electrically connect the radar sensor 100 to the vehicle.

In some embodiments, the antenna components formed on top surface of PCB 200 can include an array of receive (Rx) antennas 108 and an array of transmit (Tx) antennas 110, defined by antenna patches. The antennas can be formed by known means, such as deposition of conductive material, e.g., metal, in the desired shape, size and pattern for the desired antenna patches. In general, the receive antennas 108 are arranged together and the transmit antennas 110 are arranged together and separate from the receive antennas 108. In the example shown, the antenna arrays include a transmit array 110 consisting of three transmit antenna patches 210a-210c (generally 210) disposed on the PCB 200 and a receive array 108 consisting of six antenna patches 212a-212f (generally 212) disposed on the PCB 200.

In the illustrated implementations, the antenna patch arrays are shown disposed relative to a major axis 214 (designated the "x" axis) and a minor axis 216 (designated the "y" axis) of the PCB 200. The minor axis 216 is perpendicular to the major axis 214. In one example, the major axis 214 can represent the azimuth field of view of the sensor 100, while the minor axis 216 represents the elevation field. Each patch 210, 212 can be similar in terms of shape and size, but the patches 210, 212 can be orientated differently as described herein. The antenna patches 210, 212 are generally placed in very close proximity of each other. The receive antennas patches 212 can be separated by half the operating wavelength along the major axis 214 (i.e. azimuth axis), for example 2.3 mm, for a uniform antenna array configuration. Other operating wavelengths and separation distances may also be used. To optimize radiation performance, the antenna patches 210, 212 are placed obliquely with respect to the minor axis 216 and close together. This allows placement of larger antenna patches needed for RF performance in very close proximity of other patches while reducing undesired coupling between patches placed immediately beside each other. It also helps to take advantage of oblique polarization when electromagnetic wave interacts with the radome (cover 105) surfaces. This orientation also reduces undesired RF coupling between the antennas due to the resulting antenna proximity, placing radiating edges further away from each other. In the example shown herein, centers of the receive antenna patches 212 are aligned parallel along the major axis 214, with the patches oriented obliquely with respect to the major axis 214 (as discussed in more detail below).

Like the receive antennas patches 212, the transmit antenna patches 210 can be spaced at half the operating wavelength along the major axis 214. Further, the specific placement locations can be configured to achieve a desired two way transmit-receive channel implementation, increase channel count, and work with the shape and position of the aperture of the radar sensor 100 to improve angle performance. Centers of the transmit antenna patches 210 run along a separate axis 218, which is angled obliquely with respect to the major axis 214 (i.e. not parallel to the major axis 214). In some cases, the angle between the axis 218 and major axis 214 can be 45 degrees, or substantially 45 degrees (i.e. +/−10%). The angle is defined by the size and the characteristics of the antenna patches, spacing between them, and polarization requirements. The transmit and receive antenna patches 210, 212 can both be oriented parallel to the axis 218, and obliquely with respect to the minor axis 216 (and major axis 214), facing opposite directions to maintain angled polarization for both. This orientation can also reduce potential nonhomogeneous effects of the RF substrate (e.g. the PCB 200) and further improve RF performance of the transmit-receive channels.

For further clarification of the exemplary design of the antennas 108, 110, each patch 210, 212 can be described as having an upper patch edge 220 and a parallel lower patch edge 222. Note that the terms "upper" and "lower" are used in this context only with respect to the direction the antenna patch is extending away from a respective feed line and should not be considered an absolute orientation. Since the receive and transmit antenna patches 210, 212 are configured to face away from one another, the upper edges 220 of receive antenna patches 212 are oriented to face oppositely from the upper edges 220 of the transmit antenna patches 210. For example, the receive antenna patches 212 could be described as facing towards the upper left corner of the PCB 200 in the exemplary arrangement shown, while the transmit antenna patches 210 face the lower right corner. The transmit antenna patches 210 can be positioned such that as the patches 210 extend along the axis 218, the lower patch edge 222 can overlap the upper patch edge 220 of an adjacent antenna patch 210. For example, the lower patch edge 222 of antenna patch 210b overlaps the upper patch edge 220 of antenna patch 210a along the major axis 214. Meanwhile, the upper patch edge 220 and lower patch edge 222 of each receive antenna patch 212 are aligned with adjacent receive antenna patches 212 along the major axis 214. The orientation of the antennas 108, 110, and hence their polarization, is designed to maximize the field of view of the sensor 100 while interacting with the recessed cover 105.

In some cases, it has also been found advantageous to include one or more inoperative antenna patches between operative antenna patches. For example, in some cases, receive antenna patches 212b, 212c may be operable antenna patches, while antenna patches 212a, 212d may be inoperable antenna patches. The operable antenna patches 212b, 212c are thus positioned such that they are between the inoperative antenna patches 212a, 212d. This is done to achieve maximum similarity in RF performance as the adjacent geometries seen by patches at the edges are different from the ones in the middle and such causes differences in RF couplings hence overall performances). It should be understood that the configurations of the antennas patches 210, 212 shown herein, while advantageous, is exemplary only, and other antenna patch arrangements could also be used in other implementations.

The cover 105 of the radar sensor 100 is positioned over the antennas 108, 110 to act as a radome, protecting the antennas 110, 108 and allowing for RF signals to pass therethrough. The cover 105 can be made of a material which is characterized by RF properties such as low loss and dielectric constant values proportional to the radome thickness. The radome material is also mechanically rigid and has fabrication properties such as weldability and formability. One exemplary material is polybutylene terephthalate (PBT), which is a thermoplastic engineering polymer. The material can be reinforced by glass fiber for further enhancement of its structural integrity.

Figure 4:
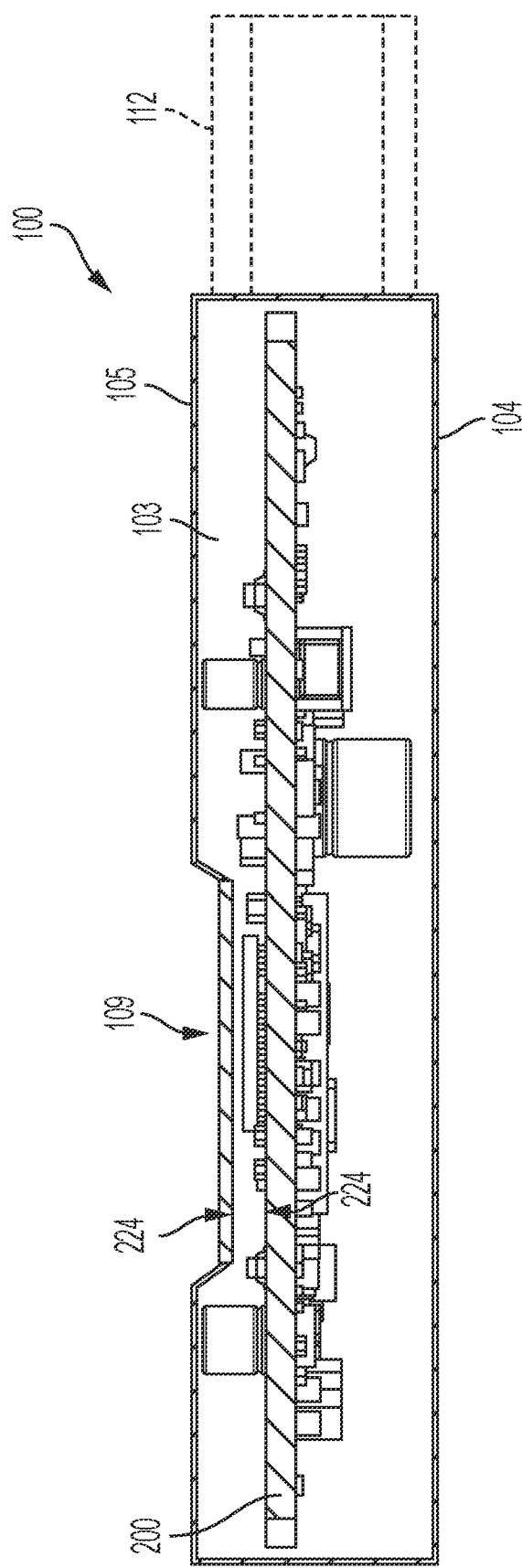
FIG. 4 is a side cross-sectional view of the radar sensor of FIG. 1.
Figure 5:
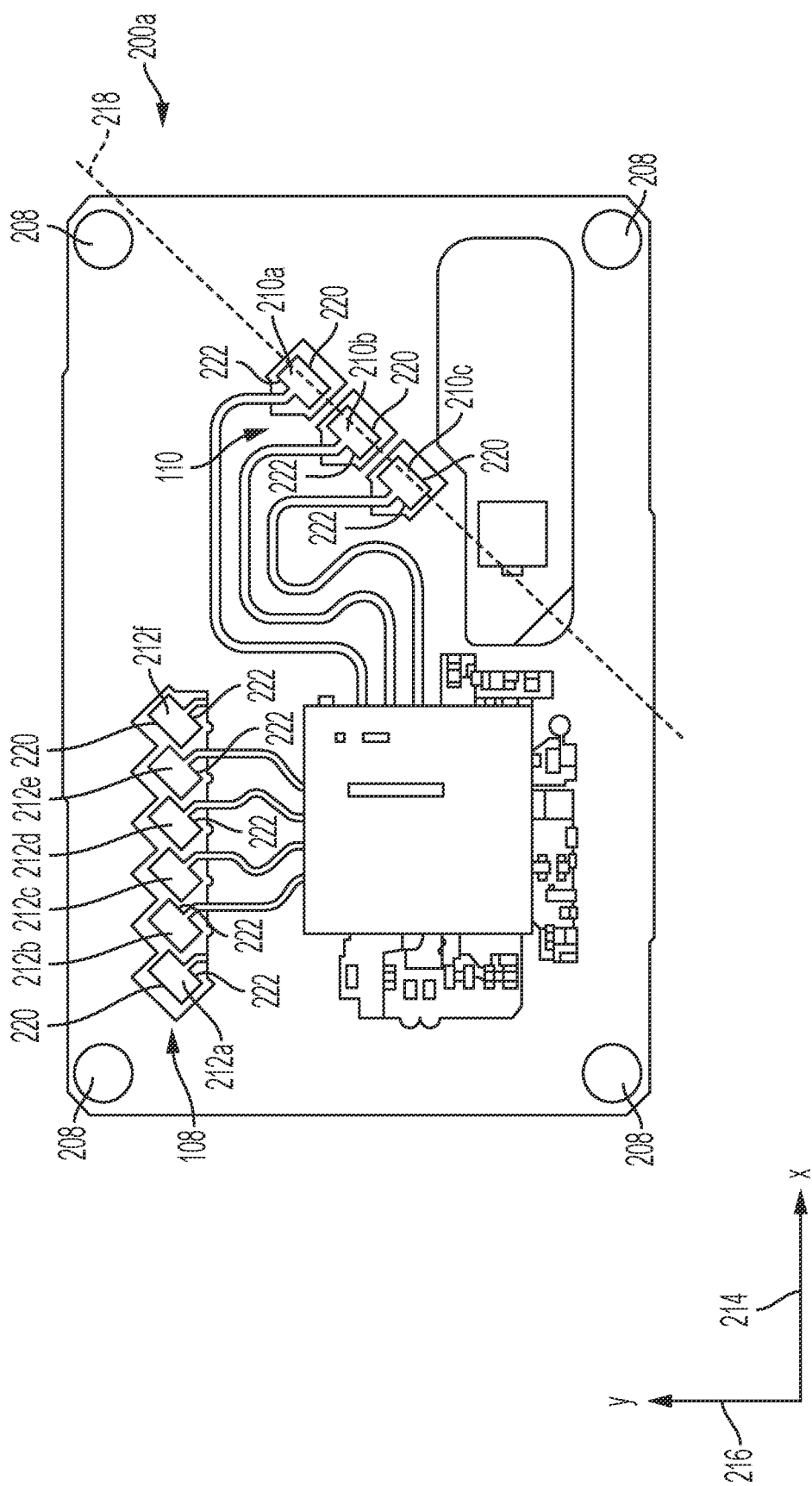
FIG. 5 is a top view of a PCB for the radar sensor of FIG. 1.
Figure 6:
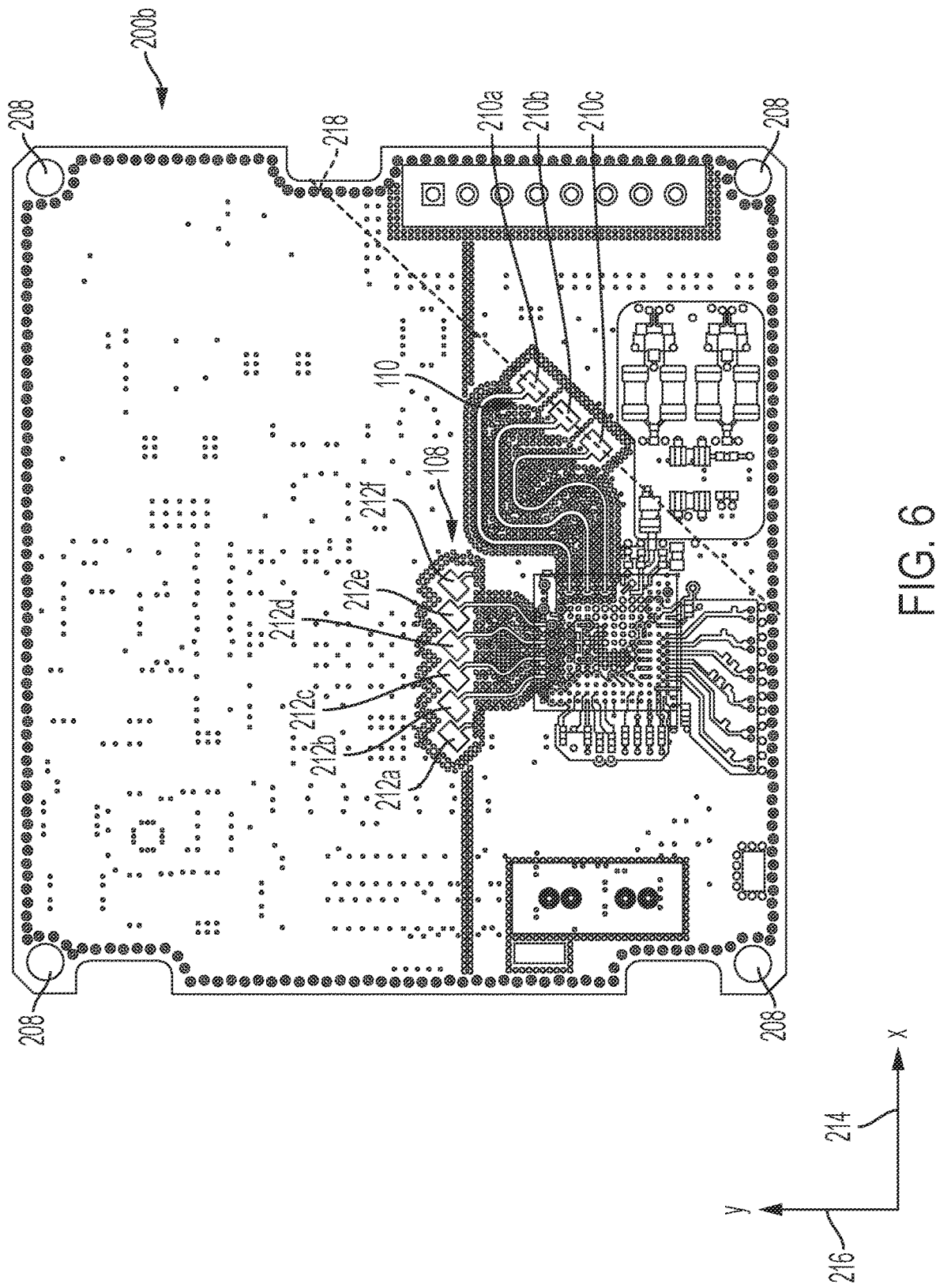

The cover 105 is positioned generally parallel to the PCB 200, and within the field of view of the antennas 108, 110, but also includes two recessed areas 111a, 111b. The first recessed area 111a is positioned directly in front of (i.e. in the field of view of) the receive antennas 108, while the second recessed area 111b is positioned directly in front of transmit antennas 110. Each recessed area 111a, 111b is recessed into the cover 105 a distance designed to maintain a gap 224 of a desired width (as best shown in FIG. 4). The preferred size of the gap 224 is based on the desired antenna properties and can vary. In one implementation, to provide optimal radiation performance with the material of choice at the desired frequency band for an ICS application being 60 GHz-64 GHz, it has been found advantageous for the radome, or cover 105, to have a thickness of 1.35 mm in the recessed areas 111 with a gap 224 size of 1.3 mm. In general, the thickness of the cover 105 at each recessed area 111a, 111b, where the cover 105 acts as the radome, is designed in accordance with desired radar properties. The overall area needed to be recessed is designed to account for all the required RF considerations hence outside that there would be flexibility in terms of radome parameters and can be picked to accommodate tall components and mechanical requirements such as rigidity, shape and thickness needed for all non-recessed areas.

As best depicted in FIG. 1, each recessed area 111a, 111b is shaped to sit above (i.e. cover) the corresponding antenna array 108, 110. Since the receive antennas 108 are arranged parallel along the axis 214, the first recess 111a can be substantially rectangular shaped. The first recessed area 111a is referred to as "substantially rectangular" since a lower corner of the first recessed area 111a overlaps with an upper corner of the second recessed area 111b, preventing the first recessed area 111a from being a complete rectangle. However, the first recessed area 111a can be defined by upper and lower edges 120, 122 which run parallel to the major axis 214, and side edges 124, 126 which run parallel to the minor axis 216. The lower edge 122 and right side edge 126 are truncated at the corner of the first recessed area 111a that intersects with the second recessed area 111b.

The second recessed area is defined by five sides 128, 130, 132, 134, 136 to form substantially a polygon shape, with the sides 128, 136 nearest the upper left corner truncated as that corner intersects the first recessed area 111a. Sides 128 and 134 run parallel to the major axis 214 while sides 130, 136 run parallel to the minor axis 216. Side 132 is runs parallel to the axis 218 of the transmit antennas 110 (see FIGS. 5-6). The recessed nature of the cover 105 allows the overall housing of the radar sensor 100 to be easily sized and shaped for particularly optimal RF radiation properties in receive and transmit channels. Further, this configuration allows for a simplified fabrication and installation process for the sensor 100.

The radar sensor 100 disclosed herein is particularly well suited for use as an ICS (In-Cabin Sensing) sensor within a vehicle. In such an application, it is desirable to have antennas with wide field of view to cover more of the interior space, which means antennas with omni-direction patterns (low gain). The arrangement of the cover 105 and antennas 108, 110 disclosed herein, including the particular radome thickness and its distance from the antenna patches 210, 212 on the PCB 200, is designed to achieve good RF performance. Deviation from such rather sensitive design values results in adversely affecting antenna patterns and reducing coverage (field of view) which subsequently causes issues with detections and classifications of the targets. PCBs also require placement of numerous other components, such as standard connectors and taller capacitors, inductors, and integrated circuits. Scenarios for effectively mounting of such sensors requires standardized bracket dimensions to be maintained (e.g. for use by OEMs), which dictates certain dimensions and clearances which often are not the most optimized in terms of RF design. The use of a recessed radome in the design disclosed herein helps achieve optimal radome parameters (thickness and distance between radome and antenna), to provide desired RF performance and antenna patterns while allowing the rest of the packaging to accommodate for all other components, including connectors, mechanical packaging sizes, and other requirements.

In particular, the radome recess can be easily reshaped to suit a different packaging geometry and resized in terms of depth (i.e. distance to the antennas) to achieve the desired radar properties. Adjustments to the radome recesses can be carried out without affecting the rest of the predefined housing and its dimensions, which allow ample space for other components of the PCB 200 within the housing 104 cavity 103. This also allows the radar sensor 100 to be implemented within varied mounting scenarios. Further, convention manufacturing techniques can be used for the cover 105 itself, as well as for attaching the cover 105 to the housing 104 (e.g. by heat sticking them together).

Whereas many alterations and modifications of the disclosure will become apparent to a person of ordinary skill in the art after having read the foregoing description, it is to be understood that the particular implementations shown and described by way of illustration are in no way intended to be considered limiting. Further, the subject matter has been described with reference to particular implementations, but variations within the spirit and scope of the disclosure will occur to those skilled in the art. It is noted that the foregoing examples have been provided merely for the purpose of explanation and are in no way to be construed as limiting of the present disclosure.

The invention claimed is:

1. A radar sensor, comprising:
a sensor housing including a cavity retaining a processing board within the cavity;
a cover forming a face of the sensor housing, the cover defining a radome having a recess into the cavity, the recess including a first area and a second area separate from and connected to the first area, wherein: the first area and the second area are each defined by a plurality of separate and distinct edges; and the first area is connected directly to the second area via a first corner of the first area that overlaps a second corner of the second area to define truncated edges of the first area and the second area;
a plurality of transmit antennas on a surface of the processing board, the transmit antennas being adjacent to and separated by a first gap from the first area, the transmit antennas configured to transmit RF signals through the first area; and
a plurality of receive antennas on the surface of the processing board, the receive antennas being adjacent to and separated by a second gap from the second area, the receive antennas configured to receive RF signals returning through the second area, wherein:
the first area and the second area of the recess are on a same plane and parallel to an outer surface of the cover.

2. The radar sensor of claim 1, wherein centers of the plurality of receive antennas are aligned parallel along a major axis.

3. The radar sensor of claim 2, wherein centers of the plurality of transmit antennas are offset from the major axis and aligned along a second axis oblique to the major axis.

4. The radar sensor of claim 3, wherein the plurality of transmit antennas and the plurality of receive antennas are oriented parallel to the second axis.

5. The radar sensor of claim 4, wherein the plurality of transmit antennas and the plurality of receive antennas are aligned to face in opposite directions.

6. The radar sensor of claim 5, wherein patches of the plurality of receive antennas and the plurality of transmit antennas are of the same shape.

7. The radar sensor of claim 3, wherein the major axis and the second axis are separated by an angle of substantially 45 degrees.

8. The radar sensor of claim 2, wherein the first area and the second area are offset with respect to the major axis.

9. The radar sensor of claim 1, wherein the plurality of receive antennas each include only a single antenna patch.

10. The radar sensor of claim 1, wherein a first receive antenna of the receive antennas includes a lower patch edge and a second receive antenna of the receive antennas includes an upper patch edge, the lower patch edge being parallel to the upper patch edge.

11. The radar sensor of claim 2, wherein:
a first transmit antenna of the transmit antennas includes a lower patch edge and a second transmit antenna of the transmit antennas includes an upper patch edge; and
at least a portion of the lower patch edge is disposed above at least a portion of the upper patch edge relative to a minor axis, the minor axis running perpendicular to the major axis.

12. The radar sensor of claim 1, wherein the plurality of receive antennas include a first receive antenna with a first antenna patch and a second receive antenna with a second antenna patch, the radar sensor further comprising a first and second inoperative antenna patch, wherein the first and second receive antennas are disposed between the first and second inoperative antenna patches.

13. The radar sensor of claim 1, wherein:
the cover thickness at the recessed area is 1.35 mm; and
the first gap and the second gap are 1.3 mm.

14. The radar sensor of claim 1, wherein the first area of the recess and the second area of the recess are parallel to the surface of the processing board.

15. The radar sensor of claim 1, wherein the first area of the recess and the second area of the recess maintain a gap of a set width from the surface of the processing board.

* * * * *